United States Patent Office 3,303,226
Patented Feb. 7, 1967

3,303,226
ISOMER TRANS, TRANS, TRANS-CYCLODO-
DECATRIENE-(1,5,9) PREPARATION
Sadao Yuguchi, Ohtsu-shi, Shiga-ken, and Tosikatu Yosida, Nara-shi, Nara-ken, Japan, assignors to Toyo Rayon Kabushiki Kaisha, Tokyo, Japan, a corporation of Japan
No Drawing. Filed Mar. 27, 1964, Ser. No. 355,451
Claims priority, application Japan, Apr. 9, 1963, 38/18,764; June 20, 1963, 38/31,039; Jan. 16, 1964, 39/1,628
5 Claims. (Cl. 260—666)

This invention concerns the preparation of cyclododecatriene-(1,5,9) from butadiene. Cyclododecatriene is useful as a starting material in synthesising the compounds of dodecan dicarboxyl acid and lactam, which monomers are used for making polyesters and polyamides, respectively.

It is known, that trans-trans-cis-cyclododecatriene-(1,5,9) is formed by 1,4-polymerisation of butadiene with a catalyst consisting of titanium halogenide, such as titanium tetrachloride, titanium trichloride, and alkyl aluminium chlorides, for example diethyl aluminium chloride. We have now found that the polymerisation of butadiene in a liquid phase in the presence of a catalytic amount of a catalyst obtained from at least one dialkyl aluminium chloride and at least one titanium compound of the formula:

$$Ti(NR_2)_nCl_{4-n} \quad (I)$$

wherein R is alkyl or aryl, and $n$ is a whole number from 1 to 4, forms cyclododecatriene-(1,5,9) at a good selectivity. By the "selectivity" here is meant the proportion of cyclododecatriene-(1,5,9) produced in the reacted butadiene expressed in terms of weight percent.

R is preferably methyl, ethyl, or phenyl. Processes for the production of some of these titanium compounds are described in the literature, for example: The production of $Ti[N(C_2H_5)_2]_4$ is described in D. C. Bradley, Journal of Chemical Society, 3859 (1960); that of $$Ti[N(C_6H_5)_2]_4$$

in D. C. Dermer & W. C. Fernelius, Z anorg. allg. Chem., 221, 83 (1934); and those of $Ti[N(C_2H_5)_2]_3Cl$

and $Ti[N(C_6H_5)_2]_2Cl_2$, in E. Benzing & W. Kovnicker, Chem. Ber. 94, 2263 (1961). Processes for producing $Ti(N(C_2H_5)_2]_2Cl_2$ and $Ti[N(C_2H_5)_2]Cl_3$ are described hereinafter in the examples. The foregoing information will enable those skilled in the art to produce other titanium compounds of the formula (I).

D. C. Bradley reports in Record of Chemical Progress 21, 179 (1960) that a Ti–N bond is not a pure ionic bond as in $TiCl_4$, but lies in the middle of a Ti–OR bond and a Ti–C bond, exhibiting a very strong covalent bond power.

The dialkyl aluminium chloride component of the catalyst, preferably has an alkyl group having 2 to 12 carbon atoms, particularly preferred examples being dimethyl aluminium chloride, diethyl aluminium chloride, dipropyl aluminium chloride and diisobutyl aluminium chloride. The dialkyl aluminium chloride may be a single compound or a mixture of dialkyl aluminium chlorides, or a mixture which includes a small amount of monoalkyl aluminium dichloride or trialkyl aluminium, etc.

In most cases, the mole ratio of the titanium compound(s) to the dialkyl aluminum chloride(s) employed is 1:1–100, preferably 1:5–50. The process of the present invention may be carried out in an inert solvent and in this case, the catalyst can be prepared by adding the necessary amount of both components of the catalyst to the inert solvent. Heating may be carried out after the addition of the total quantities of the components, or the entire titanium component and only part of the dialkyl aluminium chloride component may be first added to the inert solvent, heated as occasion demands, and the remaining dialkyl aluminium chloride component added subsequently. It is advantageous that the inert solvent is the same as that to be used in the polymerisation reaction, but it may be different provided that it is miscible with the solvent used for the polymerisation reaction.

Hydrocarbons and chlorinated hydrocarbons are particularly suitable solvents for the polymerisation reaction. Typical examples are saturated aliphatic hydrocarbons such as pentane, hexane, heptane, octane and decane; halogenated aliphatic hydrocarbons such as methylene dichloride (N.B. ethylene dichloride is undesirable); aliphatic cyclic hydrocarbons such as cyclohexane, methyl cyclohexane, cyclododecatriene-(1,5,9) and decahydro naphthalene; aromatic hydrocarbons such as benzene, toluene, xylene, ethyl benzene and tetrahydro naphthalene; and aromatic chlorinated hydrocarbons such as chlorobenzene, O-dichlorobenzene and α-chloronaphthalene. Hydrocarbon mixtures, such as white kerosine, petroleum benzene, ligroin and petroleum ether, are also suitable.

In a preferred process of this invention product cyclododecatriene-(1,5,9) is used as the inert solvent. The catalyst is deactivated with addition of a small amount of methanol to the reaction mixture and, after washing with dilute hydrochloric acid and distilling the separated oily substance, cyclododecatriene may be obtained which, after being dried by a drying agent such as silica gel, can instantly be used as solvent. This procedure avoids the necessity of providing a purifying or distilling apparatus for the solvent.

Alternatively, the process may be carried out in complete absence of a solvent, by adding a necessary amount of both catalytic components to a liquid butadiene and thereafter subjecting the mixture to reaction conditions.

When the reaction is carried out without a solvent, not only is the recovery and purification of solvent unnecessary, but also cyclododecatriene-(1,5,9) can be synthesised in good yields and/or at a good selectivity.

The reaction temperature of cyclic polymerisation may be from 0° to 150° C. and the reaction pressure may be one sufficient enough to keep the reaction system in a liquid state. When an inert solvent is used, it is preferred that the reaction temperature is not in excess of 100° C., the range from room temperature to 50° being particularly preferred; in the absence of the solvent, however, the reaction can be carried out ideally at higher temperatures. When the reaction temperature is near the upper limit there is an increased tendency to produce a by-product of a polymer of low molecular weight, thereby involving a decreased selectivity and yield of cyclododecatriene-(1,5,9). A reaction temperature lower than 0° C. gives a reaction rate which is too slow to be of practical value.

One of the characteristics of the catalytic system of this invention is that it gives trans-trans-trans-cyclododecatriene-(1,5,9). When butadiene is polymerised in an inert solvent with the aid of a known catalytic system, e.g., $TiCl_4$–$Al(C_2H_5)_2Cl$, substantially a trans-trans-cis isomer alone is formed but a $$Ti[N(C_2H_5)_2]_nCl_{4-n}–Al(C_2H_5)_2Cl$$

system gives respectively about 10–25, 50–60, 80–90 and 85% trans-trans-trans isomer when $n$ is 1, 2, 3 and 4. Also, $Ti[N(C_6H_5)_2]_nCl_{4-n}–Al(C_2H_5)_2Cl$ system gives respectively about 1.5, 3–5 and 10–25% trans-trans-trans isomer when $n$ is 1, 3 and 4 in this order.

The following examples illustrate the invention.

Example 1

(a) $Ti[N(C_2H_5)_2]_2Cl_2$ $$Ti[N(C_2H_5)_2]_4 + TiCl_4 \rightarrow 2Ti[N(C_2H_5)_2]_2Cl_2$$

In a dried nitrogen gaseous stream, a solution of 21 g. $Ti[N(C_2H_6)_2]_4$ (0.0625 mole) in 100 cc. absolute benzene is put in a 200 cc. three-necked flask equipped with a condenser, a mercury-sealed stirrer and a nitrogen-inlet tube and, with vigorous stirring at room temperature, 6.9 cc. of titanium tetrachloride (0.0625 mole) is added thereto. Instantly, warming occurs. The reaction is effected for 1 hour at room temperature and the reaction mixture is refluxed for 1 hour. After removal of benzene by distillation at a reduced pressure, the residual oily substance is distilled at a reduced pressure. 7.2 g. $Ti[N(C_2H_5)_2]_2Cl_2$ of B.P. 96 to 98° at 0.57 mm. Hg is obtained. When allowed to stand in a cool place, it is crystallised and the resulting crystals are then washed with petroleum ether. Brown, needle-shaped crystals having M.P. 67–69° C. are obtained. The formation is confirmed by the results of an element analysis.

Values of element analysis (Ti): Found 18.26%. Calculated 18.21%.

Example 2

A solution of 1.0554 millimole $Ti[N(C_2H_5)_2]_3Cl$ and 3.975 millimole $Al(C_2H_5)_2Cl$ in 30 cc. benzene is put in a 100 cc. pressure bottle and, on addition of 20 cc. butadiene, shaken for 24 hours at room temperature. At the end of the reaction, the catalyst is deactivated by adding a very small amount of methanol, followed by the addition of dilute hydrochloric acid. Extraction with ether is then carried out and the ether layer washed with water and dried with sodium sulphate. After removal of the ether, the residual oily substance is distilled. The distillate is identified as cyclododecatriene-(1,5,9) from the following data.

*The identification of the reaction product*

(1) Boiling and melting points:

|  | B.P. | M.P., ° C. |
|---|---|---|
| Reaction product | 92° C./12.8 mm. Hg | 30–32 |
| Trans-trans-trans isomer* | 95° C./13 mm. Hg | 34 |
| Trans-trans-cis isomer | 100–101° C./11 mm. Hg | –18 |

*G. Wilke, Journal of Polymer Science, 38, 45 (1959).

(2) Infrared ray absorption spectrum:

|  | CH of trans-double bond | | |
|---|---|---|---|
| Reaction product,* cm.-1 | 958 | 982 | 1,022 |
| Trans-trans-trans isomer, cm.-1 | 952 | 977 | 1,016 |
| Trans-trans-cis isomer, cm.-1 | 952 | 968 | 1,015 |

*Ann. 618, 276 (1958).

(3) Gas chromatography:

In comparison with a pure product, the reaction product is identified and the reaction ratio of a trans-trans-trans isomer and a trans-trans-cis isomer is calculated. Of the above reaction product, trans-trans-trans-cyclododecatriene-(1,5,9) accounts for 89.4% and trans-trans-cis-cyclododecatriene-(1,5,9), 10.6%.

Example 3

A solution of 1.0554 millimole $Ti[N(C_2H_5)_2]_3Cl$ and 11.935 millimole $Al(CH_2H_5)_2Cl$ in 30 cc. benzene is put in a 100 cc. pressure bottle and, on addition of 20 cc. butadiene, subjected to reaction for 24 hours at room temperature. The after-treatment is the same as in Example 2. 3.5 g. of cyclododecatriene is formed. The yield is 27%. A trans-trans-trans isomer is 81% and a trans-trans-cis isomer, 19%, based on the reaction product.

Example 4

A solution of 1.0554 millimole $Ti[N(C_2H_5)_2]_2Cl_2$ and 7.953 millimole $Al(C_2H_5)_2Cl$ in 30 cc. benzene is put in a 100 cc. pressure bottle and, on addition of 20 cc. butadiene, allowed to stand for 46 hours at room temperature. The after-treatment is the same as in Example 2. 7.67 g. of cyclododecatriene is formed. The yield is 59%. A trans-trans-trans isomer is 58.4% and a trans-trans-cis isomer, 41.6%, based on the reaction product.

Example 5

A solution of 0.59 millimole $Ti[N(C_2H_5)_2]_2Cl_2$ and 7.95 millimole $Al(C_2H_5)_2Cl$ in 30 cc. benzene is put in a 100 cc. pressure bottle and, on addition of 13 g. butadiene, shaken for 5.5 hours at room temperature. 5.33 g. of cyclododecatriene is formed. The yield is 41%. This yield, if calculated in terms of the weight per 1 g. of catalyst, is 34.38 g. A trans-trans-trans isomer accounts for 48.5% and a trans-trans-cis isomer, 51.5%, of the reaction product.

Example 6

A solution of 0.775 millimole $Ti[N(C_2H_5)_2]_2Cl_2$ and 7.155 millimole $Al(C_2H_5)_2Cl$ in 30 cc. benzene is put in a 100 cc. pressure bottle and, on addition of 13 g. butadiene, shaken for 3 hours at room temperature. 4.21 g. of cyclododecatriene is formed. The yield is 32.4%. This yield, if calculated in terms of the weight per 1 g. of $Ti[N(C_2H_5)_2]_2Cl_2$, is 22.5 g. A trans-trans-trans isomer is 62.7% and a trans-trans-cis isomer, 37.3%, based on the reaction product.

Example 7

A solution of 0.548 millimole $Ti[N(C_2H_5)_2]_4$ and 4 cc. $Al(C_2H_5)_2Cl$ in 90 cc. benzene is put in 200 cc. stirring pressure bottle and, on addition of 70 cc. liquid butadiene, reacted for 20 hours at room temperature at a pressure of 1 kg./cm.². 11.82 g. of cyclododecatriene results. The yield is 26%. The selectivity of the cyclododecatriene is 44%.

Example 8

52 g. of liquid butadiene is put in a 100 cc. shaking autoclave cooled by Dry Ice-methanol and, on addition of 1 millimole $Ti[N(C_2H_5)_2]_4$ and 31.5 millimole $Al(C_2H_5)_2Cl$, reacted for 1.5 hours at a temperature of 50° C. At the end of the reaction, the catalyst is deactivated by adding a small amount of methanol and extraction is carried out with ether. The ether layer is washed first with dilute hydrochloric acid and then with water. After removal of the ether, the residual oily substance is distilled at a reduced pressure. 26.4 g. of a fraction of B.P. 99–100° C. at 11 mm. Hg results. The yield is 51.5%.

Example 9

52 g. of liquid butadiene is put in a 100 cc. autoclave and, on addition of 1 millimole $Ti[N(C_2H_5)_2]_4$ and 31.5 millimole $Al(C_2H_5)_2Cl$, reacted for 1.5 hours at a temperature of 70° C. At the end of the reaction, treatment is carried out in accordance with the procedure of Example 20 to form 12.6 g. of cyclododecatriene-(1,5,9).

Example 10

52 g. of liquid butadiene, 1 millimole $Ti[N(C_2H_5)_2]_4$ and 31.5 millimole $Al(C_2H_5)_2Cl$ is put in a 100 cc. autoclave and reacted for 1.5 hours at a temperature of 90° C. The pressure reaches 11.5 kg./cm.² at its maximum. At the end of the reaction, treatment is carried out in accordance with the procedure of Example 20 to form 4.9 g. of cyclododecatriene-(1,5,9).

What we claim is:

1. Process for preparing the trans, trans, trans isomer of cyclododecatriene-(1,5,9) which comprises cyclopolymerising butadiene in a liquid phase in contact with a catalytic amount of a catalyst obtained from at least one dialkyl aluminium chloride and at least one preformed titanium compound of the formula:

$$Ti(NR_2)_nCl_{4-n}$$

wherein R is ethyl, and $n$ is a whole number selected from 3 or 4.

2. Process in accordance with claim 1 wherein the molar ratio of aluminium to titanium of the catalyst is from 1:1 to 1:100.

3. Process in accordance with claim 1, wherein the butadiene is cyclopolymerised in an inert organic solvent at a temperature of from 0° to 100° C.

4. Process in accordance with claim 3 wherein the inert organic solvent is cyclododecatriene-(1,5,9).

5. Process in accordance with claim 1, wherein the catalyst is prepared in a liquid butadiene and the resulting liquid mixture is heated to a temperature of from 0° to 150° C.

References Cited by the Examiner

UNITED STATES PATENTS 3,055,878  9/1962  Janoski _____ 260—93.7
3,149,173  9/1964  Wittenberg et al. ____ 260—666

FOREIGN PATENTS 1,317,859  1/1963  France.

DELBERT E. GANTZ, *Primary Examiner.*

V. O'KEEFE, *Assistant Examiner.*